(12) United States Patent  (10) Patent No.: US 8,439,374 B1
Elden  (45) Date of Patent: May 14, 2013

(54) LIGHTWEIGHT HIGH LOAD CAPACITY FOLDING UTILITY CART WITH UNIQUE SUPPORT STRUCTURE AND ERGONOMIC HANDLE

(76) Inventor: Richard Elden, Carson, CA (US)

( * ) Notice: Subject to any disclaimer, the term of this patent is extended or adjusted under 35 U.S.C. 154(b) by 373 days.

(21) Appl. No.: 12/930,457

(22) Filed: Jan. 7, 2011

Related U.S. Application Data (60) Provisional application No. 61/395,485, filed on May 14, 2010.

(51) Int. Cl.
 *B62B 1/12* (2006.01)
(52) U.S. Cl.
 USPC .................. 280/47.26; 644/652; 644/DIG. 3
(58) Field of Classification Search .............. 280/30, 280/35, 47.26, 47.34, 47.35, 644, 651, 652, 280/DIG. 3, DIG. 4
 See application file for complete search history.

(56) References Cited

U.S. PATENT DOCUMENTS

| | | | | |
|---|---|---|---|---|
| 1,554,034 A | * | 9/1925 | Richie | 280/654 |
| 2,371,472 A | * | 3/1945 | Ruff et al. | 280/652 |
| 2,472,203 A | * | 6/1949 | Friedmann et al. | 280/652 |
| 2,564,939 A | * | 8/1951 | Weast | 280/652 |
| 2,786,692 A | | 3/1957 | Timpson | |
| 3,092,395 A | | 6/1963 | Mitty et al. | |
| 3,135,527 A | | 6/1964 | Knapp | |
| 3,279,811 A | * | 10/1966 | Mitty et al. | 280/47.26 |
| 3,285,620 A | * | 11/1966 | Mitty et al. | 280/47.26 |
| 3,427,040 A | * | 2/1969 | Jenkins | 280/652 |
| 3,492,016 A | * | 1/1970 | O'Connor et al. | 280/47.26 |
| D292,135 S | | 9/1987 | Grube | |
| 4,765,644 A | | 8/1988 | Bell | |
| 4,765,646 A | | 8/1988 | Cheng | |
| 5,197,754 A | | 3/1993 | Ward | |
| 5,244,219 A | | 9/1993 | Hadlum | |
| 5,988,671 A | | 11/1999 | Abelbeck et al. | |
| 6,073,943 A | * | 6/2000 | Serrault | 280/47.26 |
| 6,293,569 B1 | * | 9/2001 | Ferre | 280/35 |
| 6,598,898 B2 | | 7/2003 | Chu | |
| D477,916 S | | 8/2003 | Nykoluk | |
| 6,651,791 B1 | | 11/2003 | Nykoluk et al. | |
| 6,918,474 B2 | | 7/2005 | Nykoluk | |
| 6,955,365 B2 | * | 10/2005 | Giampavolo et al. | 280/47.26 |
| 7,726,671 B2 | * | 6/2010 | Musi | 280/47.26 |
| 7,731,221 B2 | | 6/2010 | Bess | |
| 2002/0050429 A1 | | 5/2002 | Nykoluk et al. | |
| 2002/0139628 A1 | | 10/2002 | Chang | |
| 2002/0144874 A1 | | 10/2002 | Nykoluk et al. | |
| 2004/0211635 A1 | | 10/2004 | Lu | |
| 2009/0212536 A1 | | 8/2009 | Tadeo | |

* cited by examiner

*Primary Examiner* — Hau Phan
*Assistant Examiner* — Bridget Avery
(74) *Attorney, Agent, or Firm* — Thomas I. Rozsa (57) ABSTRACT

A lightweight cart which weighs less than three pounds but has a structural design which enables the cart to retain and transport objects which weigh over one hundred and ten pounds. The cart can fold down to two inches for storage, a flat thickness which is at least one inch less thick than conventional foldup carts.

18 Claims, 12 Drawing Sheets

LIGHTWEIGHT HIGH LOAD CAPACITY FOLDING UTILITY CART WITH UNIQUE SUPPORT STRUCTURE AND ERGONOMIC HANDLE

This patent claims the benefit under Title 35, U.S.C. §119 (e) of Provisional Patent Application No. 61/395,485 filed May 14, 2010.

BACKGROUND OF THE INVENTION

1. Field of the Invention

The present invention relates to the field of fold-up two wheeled transport carts which are used to retain objects and transport them from one location to another, and which cart can thereafter be folded up and conveniently stored until the next time it is required to transport objects.

2. Description of the Prior Art

The following 21 patents and published applications are relevant to the field of the present invention:

1. U.S. Pat. No. 2,564,939 issued to Louis S. Weast on Aug. 21, 1951 for "Foldable Shopping Cart" (hereafter the "Weast Patent");
2. U.S. Pat. No. 2,786,692 issued to Anne Jackson Timpson on Mar. 26, 1957 for "Collapsible Cart" (hereafter the "Timpson Patent");
3. U.S. Pat. No. 3,092,395 issued to Sol Mitty et al. on Jun. 4, 1963 for "Corrugated Shopping Cart and Parts" (hereafter the "Mitty Patent");
4. U.S. Pat. No. 3,135,527 issued to Philip B. Knapp on Jun. 2, 1964 for "Wheeled Market Carts" (hereafter the "Knapp Patent");
5. U.S. Pat. No. Des. 292,135 issued to John W. Grube et al. on Sep. 29, 1987 for "Collapsible Cart" (hereafter the "Grube Patent");
6. U.S. Pat. No. 4,765,644 issued to Laurence G. Bell on Aug. 23, 1988 for "Foldable Cart" (hereafter the "Bell Patent");
7. U.S. Pat. No. 4,765,646 issued to Karen Cheng on Aug. 23, 1988 for "Collapsible Shopping Cart" (hereafter the "Cheng Patent");
8. U.S. Pat. No. 5,197,754 issued to Lyla B. Ward on Mar. 30, 1993 for "Collapsible Beach Cart" (hereafter the "Ward Patent");
9. U.S. Pat. No. 5,244,219 issued to Sidney R. Hadlum on Sep. 14, 1993 for "Hand Held Carrier" (hereafter the "Hadlum Patent");
10. U.S. Pat. No. 5,988,671 issued to Kevin G. Abelbeck et al. on Nov. 23, 1999 for "Collapsible Cart" (hereafter the "Abelbeck Patent");
11. United States Published Patent Application No. 2002/0050429 to Cory O. Nykoluk et al. on May 2, 2002 for "Pivotal Handle For Towable Baggage" (hereafter the "'0050429 Nykoluk Published Patent Application");
12. United States Published Patent Application No. 2002/0139628 to Wen-Cheng Chang on Oct. 3, 2002 for "Retractable Handle Assembly" (hereafter the "Chang Published Patent Application");
13. United States Published Patent Application No. 2002/0144874 to Cory O. Nykoluk et al. on Oct. 10, 2002 for "Pivotal Handle For Towable Baggage" (hereafter the "'0144874 Nykoluk Published Patent Application");
14. U.S. Pat. No. 6,598,898 issued to Yong S. Chu on Jul. 29, 2003 for "Folding Cart" (hereafter the "Chu Patent");
15. U.S. Pat. No. D477,916 issued to Cory O. Nykoluk on Aug. 5, 2003 for "Towing Member For A Piece of Baggage" (hereafter the "Nykoluk Design Patent");
16. U.S. Pat. No. 6,651,791 issued to Cory O. Nykoluk et al. on Nov. 25, 2003 for "Pivotal Handle For Towable Baggage" (hereafter the "'791 Nykoluk Patent");
17. United States Published Patent Application No. 2004/0211635 to Chen-Tien Lu on Oct. 28, 2004 for "Apparatus for Mounting Telescopic Handle on Trunk" (hereafter the "Lu Published Patent Application");
18. U.S. Pat. No. 6,918,474 issued to Cory O. Nykoluk on Jul. 19, 2005 for "Towable Wheeled-Backpack" (hereafter the "'474 Nykoluk Patent");
19. United States Published Patent Application No. 2009/0212536 to Maria I. Tadeo on Aug. 27, 2009 for "Collapsible Rolling Tote Bag" (hereafter the "Tadeo Published Patent Application");
20. U.S. Pat. No. 7,731,221 issued to Suzan L. Bess on Jun. 8, 2010 for "Collapsible and Portable Wheeled Dolly Particularly Suitable for Use by Students or Others in the Transport of Items" (hereafter the "Bess Patent").

The Weast Patent discloses a foldable shopping cart.

The Timpson Patent also discloses a collapsible cart.

The Mitty Patent discloses a corrugated shopping cart having a collapsible and reversible shopping cart comprising a box-like body having a rear panel, side panels and a sectional front panel, said panels having overlapping bottom flaps constituting a bottom panel, the sections of the front panel having overlapping long edges, said overlapping edges having aligned spaced slots, pronged pins in the slots for detachably fastening said overlapped edges to each other, a handle on the rear panel protruding upwardly therefrom, and a wheel assembly mounted on the bottom panel, the mounting of the wheel assembly constituted by a fold in the flap on the rear panel adjacent the rear panel, the fold in the flap on the rear panel forming a triangular-shaped groove opening downwardly and wherein a tape closes the bottom opening in the groove.

The Knapp Patent discloses a collapsible wheeled market cart which can be folded very flat to 2 inches.

The Grube Design Patent discloses a generally rectangular two-wheeled cart.

The Moon Patent discloses a utility cat with a bent handle.

The Bell Patent discloses a folding cart which can be folded but is not completely flat when folded.

The Cheng Patent discloses a collapsible cart.

The Ward Patent discloses a collapsible beach cart.

The Hadlum Patent discloses a collapsible cart.

The Abelbeck Patent discloses a collapsible cart but it does not fold flat

The 0050429 Nykoluk Published Patent Application discloses a cart with a collapsible arcuate handle. The hand grip can be rotated so that it can be in the same axis as the baggage is wheeled or perpendicular to the axis in which the baggage is wheeled. The cart does not fold up/

The Chang Published Patent Application discloses a cart with a dual handle.

The 0144874 Nykoluk Published Patent application is a continuation-in-part of the previously discussed Nykoluk published patent application. The application concentrates on the towing handle and the features of the towing handle are best described in claim 1 which reads as follows:

"A towing member for hand towing a piece of baggage, the towing member comprising: a towing handle; an arm portion operatively connected to the towing handle, the arm portion being configure and adapted to secure the towing handle to a piece of baggage; a pivot mechanism connecting the towing handle to the arm portion in a manner that allows the towing handle to be pivoted about a pivot axis relative to at least a sub portion of the arm portion, the sub portion of the arm portion being spaced from and external of the piece of baggage when the towing handle is secured to the piece of baggage via the arm portion; and a locking mechanism that is operatively connected to the towing handle and the arm portion and that is selectively moveable between a locked position and an unlocked position relative to the arm portion, the locking mechanism limiting the pivoting of the towing handle about the pivot axis relative to the sub portion of the arm portion when in the locked position and not so limiting the pivoting of the towing handle about the pivot axis relative to the sub portion of the arm portion when in the unlocked position."

The Chu Patent discloses a folding cart.

The Nykoluk Design Patent protects the shape of the handle wherein an examination of FIG. 2 shows that the handle has 2 vertical extension members from the hand grip portion and the hand grip portion is different from the hand grip portion in the 2 previously discussed Nykoluk Published Patent Applications.

The '791 Nykoluk Patent discloses a cart which has a collapsible handle which is arcuate in shape and the hand grip portion can be rotatable to different orientations.

The Lu Published Patent Application discloses a cart with an arcuate handle.

The '474 Nykoluk Patent discloses a cart which has an arcuate handle.

The Tadeo Published Patent Application discloses a collapsible rolling tote bag.

The Bess Patent discloses a collapsible cart.

SUMMARY OF THE INVENTION

The present invention is a collapsible cart made of fabric material having a lengthwise crease along each sidewall to enable the cart to be folded flat with the front wall resting adjacent the back wall.

One unique feature of the present invention is a fold-over top having a front wall and a pair of oppositely disposed sidewalls, each of which respectively fold over the front and opposite sidewalls and are retained in place by mating fastening members to retain the cart in a closed position.

The cart also has a collapsible ergonomic handle which collapses into the cart when the cart is not in use and extends at an ergonomic curve when the cart is in use to facilitate comfort when pulling the cart.

The most unique feature of the present invention is the design of the rear wheels which are wide wheels housed in a respective support wheel assembly having a frame to rotatably support each wheel on a respective axle. Each frame further includes a front plate extending forwardly from each respective wheel and a rear plate by which the wheel frame is retained onto the rear wall of the cart. The lower wall of the cart also has a rectangular frame supporting a pair of spaced apart posts. The interior of the cart has a fold-up hard base surface made of hardboard. The combination of the hardboard base supported against the two side wheels respectively retained in a frame having a forward plate assembly by providing structural weight support combined with the front rectangular beam with two spaced apart supporting posts enables the very lightweight cart which weighs less than three (3) pounds to support and transport a load which weights over one hundred and ten (110) pounds. The unique design also enables the cart to be folded flat so that it is less than two inches, one inch less than conventional carts.

It is a key object of the present invention to provide a lightweight cart which weighs less than three pounds but has a structural design which enables the cart to retain and transport objects which weigh over one hundred and ten pounds.

It is another key object of the present invention to provide a cart which folds down to two inches for storage, a flat thickness which is at least one inch less thick than conventional fold-up carts.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 13, the present invention cart 10 is made a fabric material such as neoprene to provide a sturdy structure which can be easily folded flat. The present invention cart 10 is illustrated in its opened condition in FIGS. 1 through 8. The cart has an integrally formed front wall 20 having a front outer surface 22, a rear interior surface 24, a first longitudinal edge 25, a bottom edge 26, a top edge 27 and a second longitudinal edge 28. The cart 10 has an integrally formed first sidewall 30 having an outer surface 32, an inner surface 34, a first longitudinal edge 35, a bottom edge 36, a top edge 37 and a second longitudinal edge 38. The first sidewall 30 has a central longitudinal crease 30A enabling the first sidewall to be folded inwardly The cart has an integrally formed rear wall 40 having an outer rear surface 42, an interior surface 44, a first longitudinal edge 45, a bottom edge 46, a top edge 47 and a second longitudinal edge 48. The cart 10 has an integrally formed second sidewall 50 having an outer surface 52, an inner surface 54, a first longitudinal edge 55. A bottom edge 56, a top edge 57 and a second longitudinal edge 58. The second t sidewall 50 has a central longitudinal crease 50A enabling the second sidewall to be folded inwardly. The cart 10 has a bottom wall 60 having an outer lower surface 62, a inner surface 64, a front edge 65, a first side edge 66, a rear edge 67 and a second side edge 68.

The cart 10 is integrally formed so that the front wall 20 is attached to the bottom wall 60 and to the first sidewall 30 and second sidewall 50, along respective edges 26 and 65, 25 and 35, and 28 and 55. The first sidewall 30 is attached to the bottom wall 60 and to the front wall 20 and rear wall 40 along respective edges 36 and 66, 35 and 25, and 38 and 45. The rear wall 40 is attached to the bottom wall 60 and to the first sidewall 30 and to the second sidewall 50 along respective edges 46 and 67, 45 and 38, and 48 and 58. The second sidewall 50 is attached to the bottom wall 60, to the rear wall 20 and to the front wall 40 along respective edges 56 and 68, 58 and 48, and 55 and 28. The cart also contains a rotatable base member 70 having a front edge 72 affixed to the front bottom edge 26 of front wall 20 and front edge 65 of bottom wall 60. The base member 70 has a hard interior 74 made a strong material such a fiberboard which is surrounded by fabric forming a lower surface 76 and an upper surface 78. When in use, the base member 70 is rotated so that its lower surface 76 rests against interior surface 64 of bottom wall 60 to form a strong base and to keep the cart in an opened condition so that the sidewalls 30 and 50 cannot fold inwardly. When the base member 70 is rotatable so that its upper surface 78 rest against interior surface 24 and front wall 20, the cart 10 can be folded.

Figure 1:
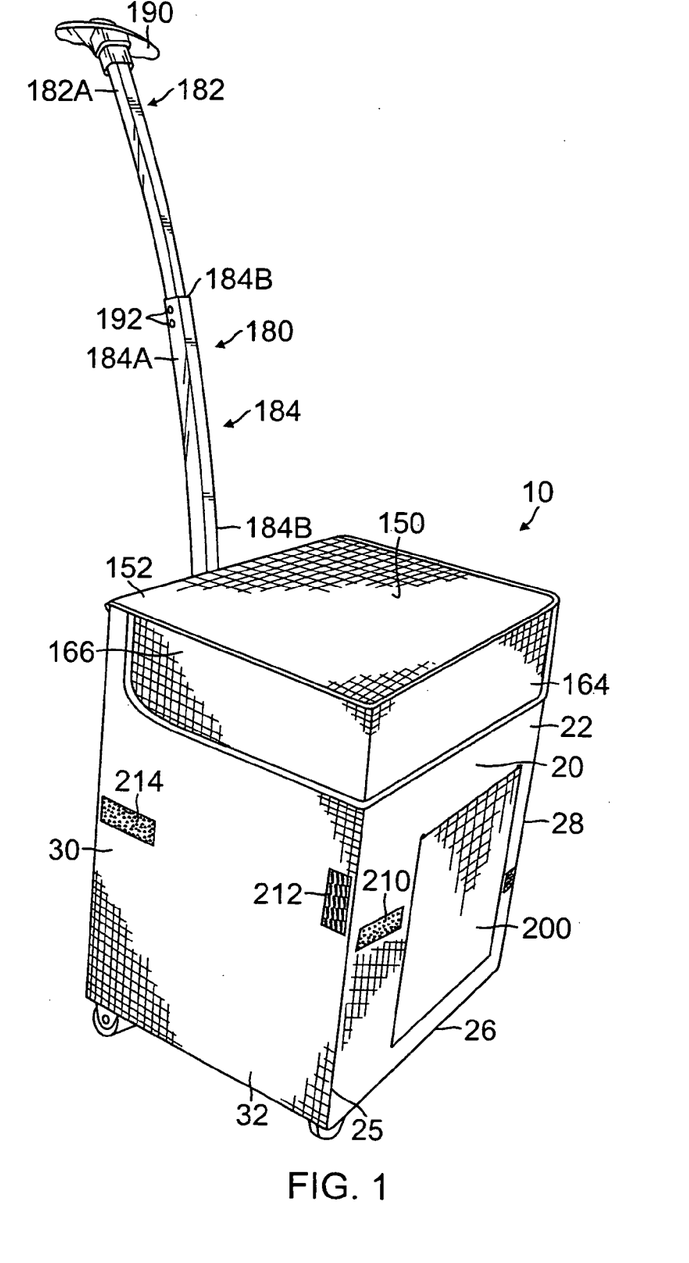
FIG. 1 is a perspective view of the present invention lightweight high load capacity folding utility cart with a unique support structure and ergonomic handle.
Figure 2:
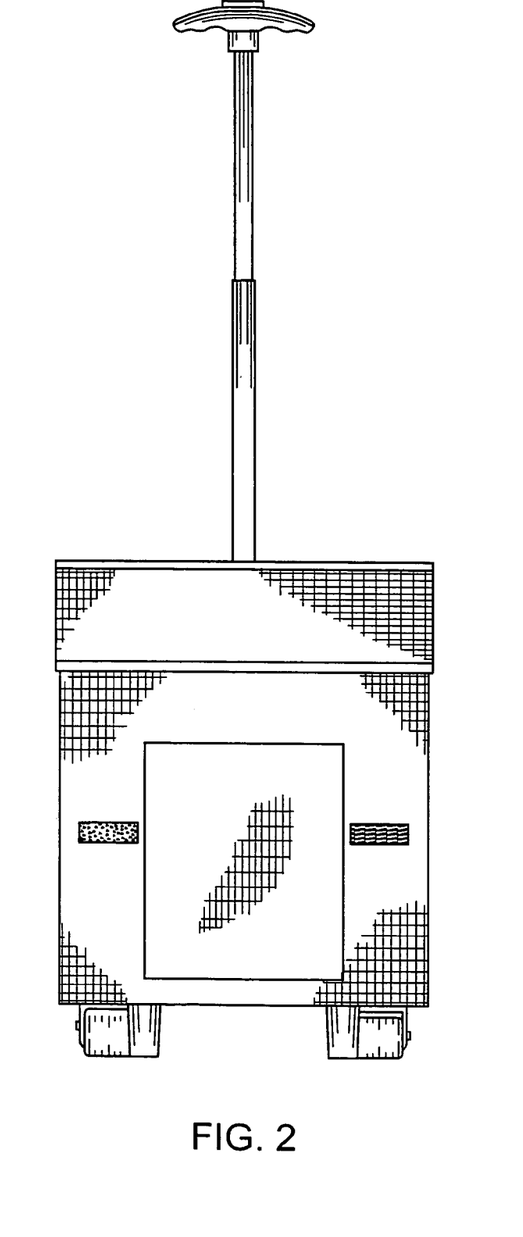
FIG. 2 is a front elevational view of the present invention cart.
Figure 3:
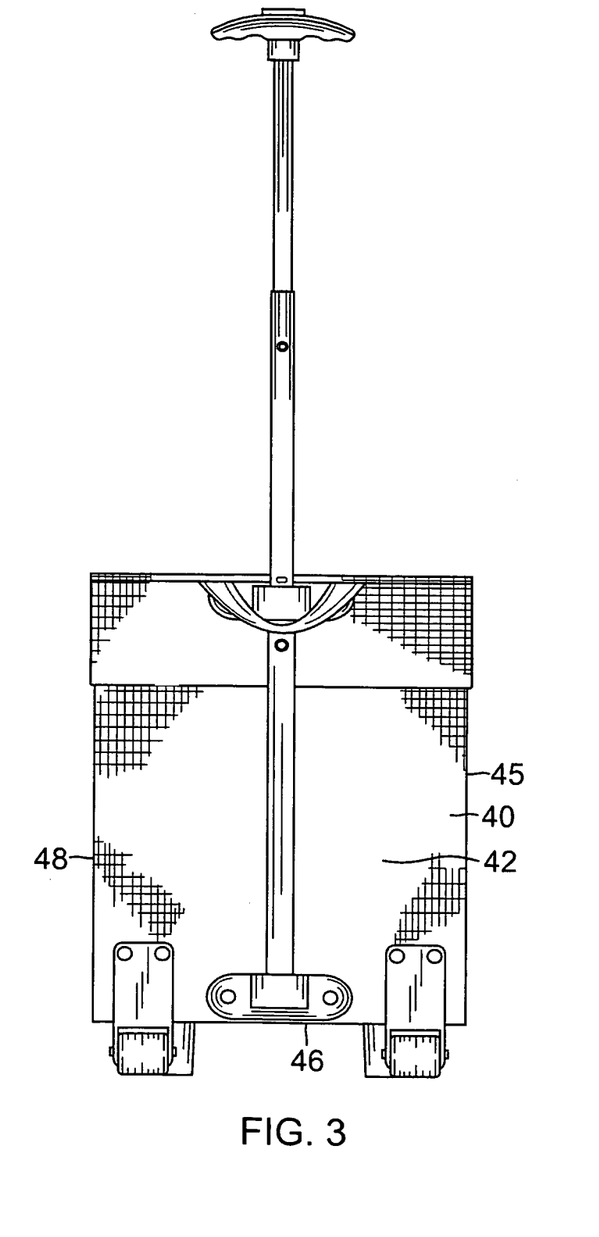
FIG. 3 is a rear elevational view of the present invention cart.
Figure 4:
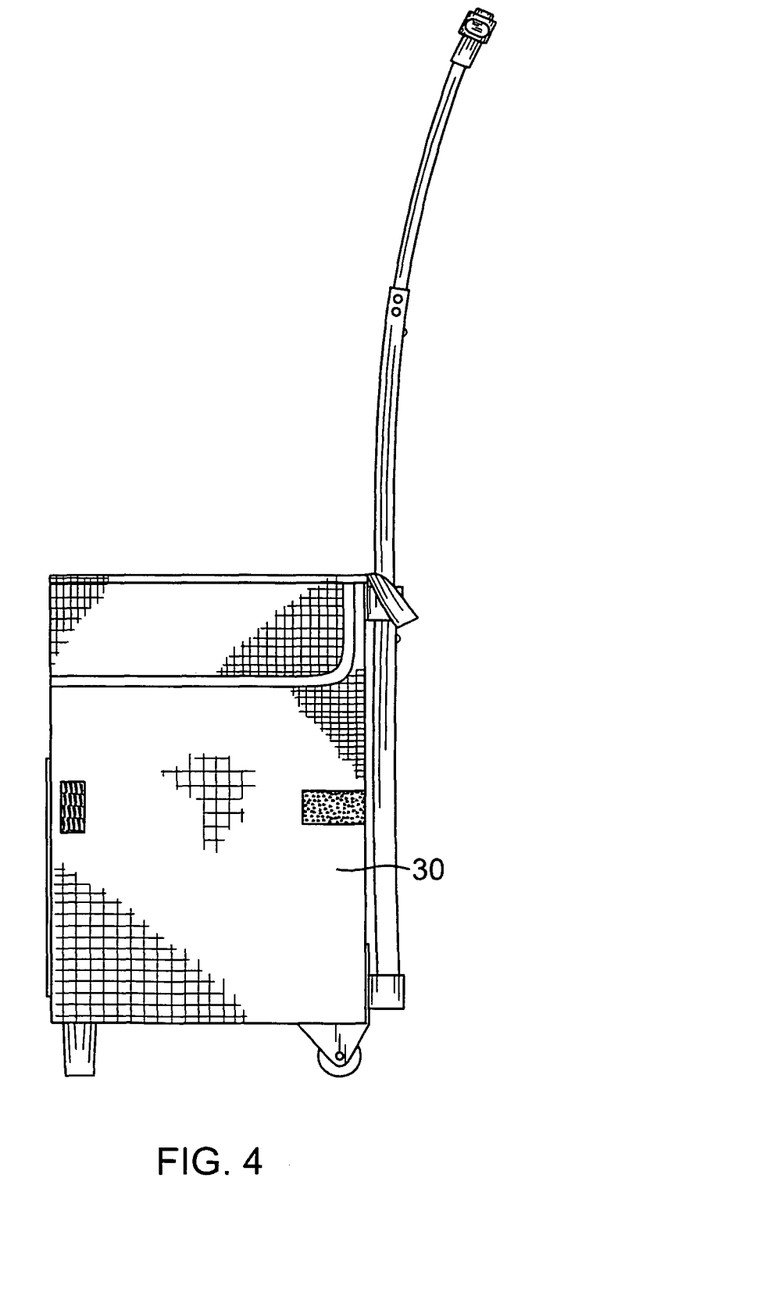
FIG. 4 is a side elevational view when viewed from the right side of the present invention cart.
Figure 5:
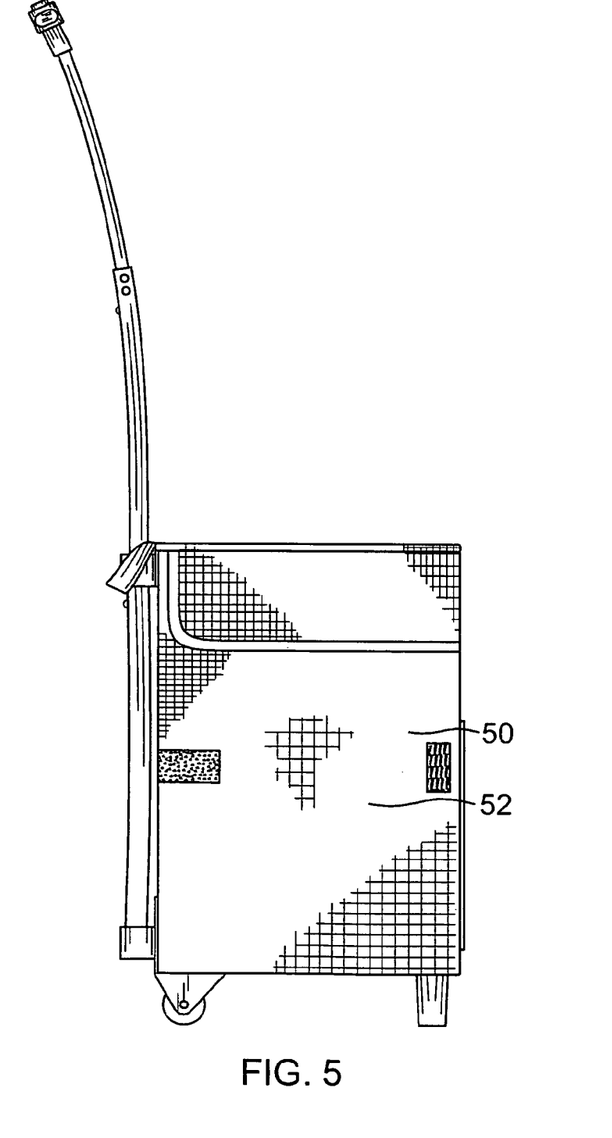
FIG. 5 is a side elevational view when view from the left side of the present invention cart.
Figure 6:
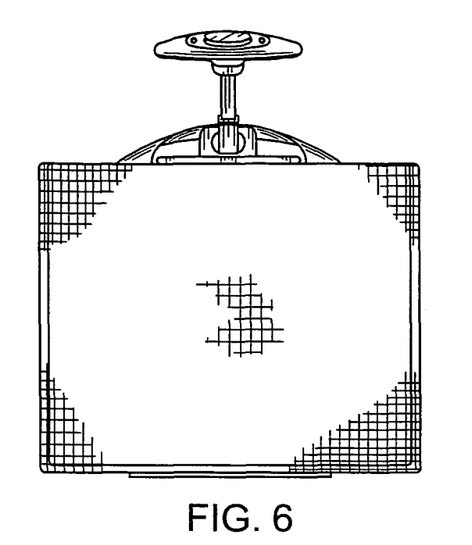
FIG. 6 is a top plan view of the present invention cart.
Figure 7:
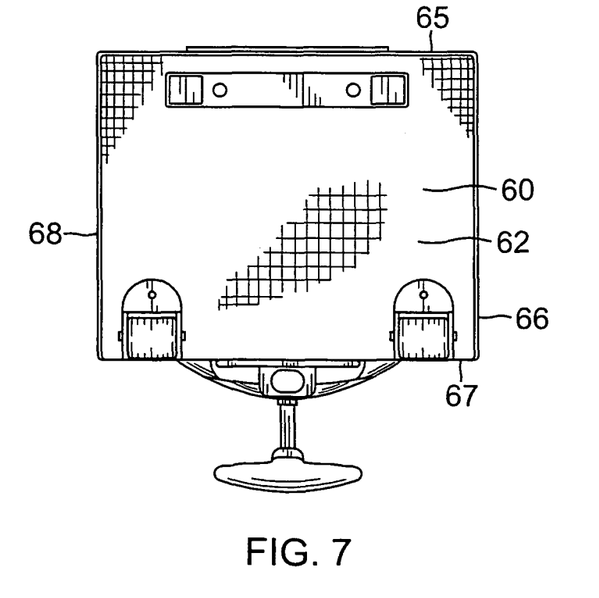
FIG. 7 is a bottom plan view of the present invention cart.
Figure 8:
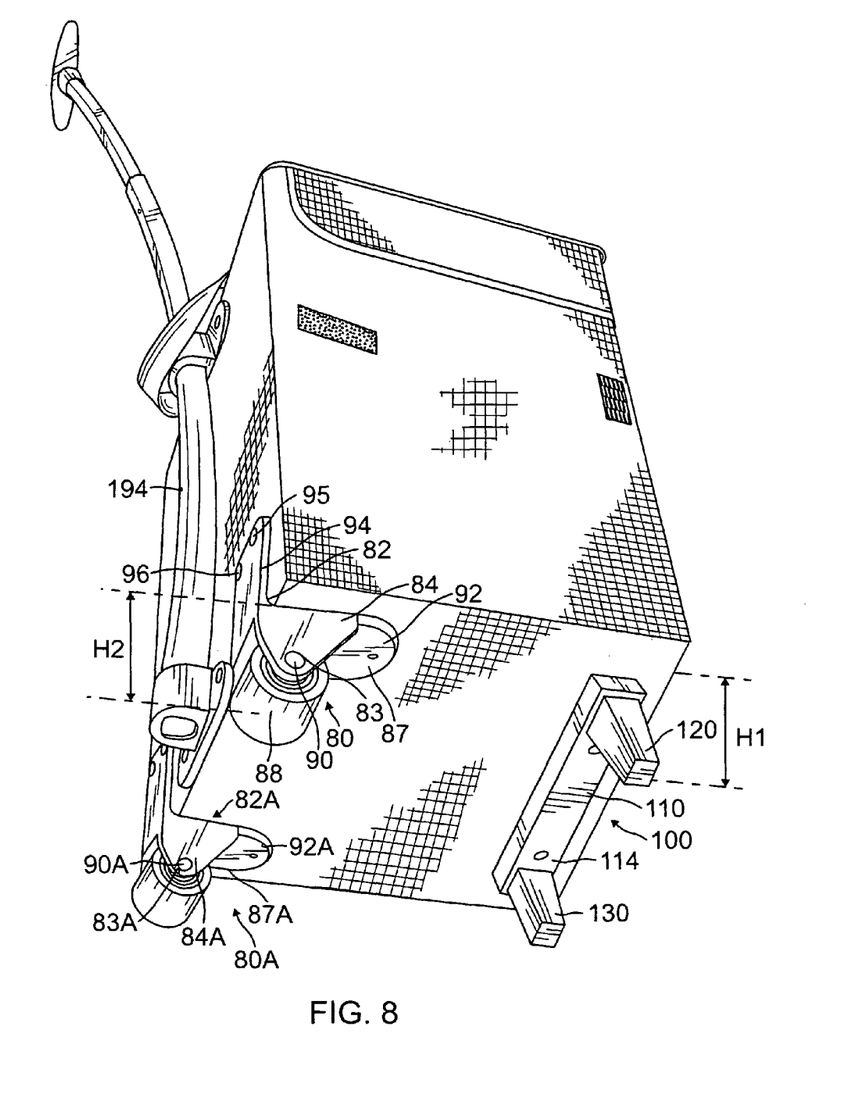
FIG. 8 is a bottom perspective view of the present invention cart.
Figure 9:
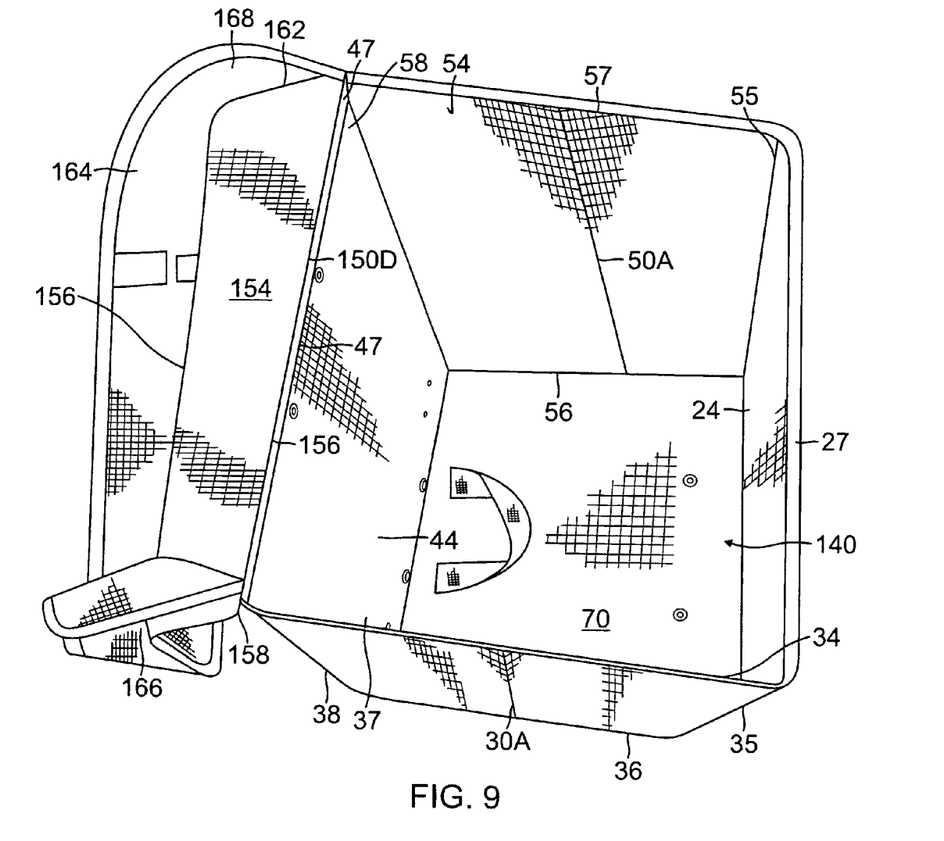
FIG. 9 is a top perspective view of the present invention cart in the opened condition with the top set away from the interior chamber and the rotatable base member in place.
Figure 10:
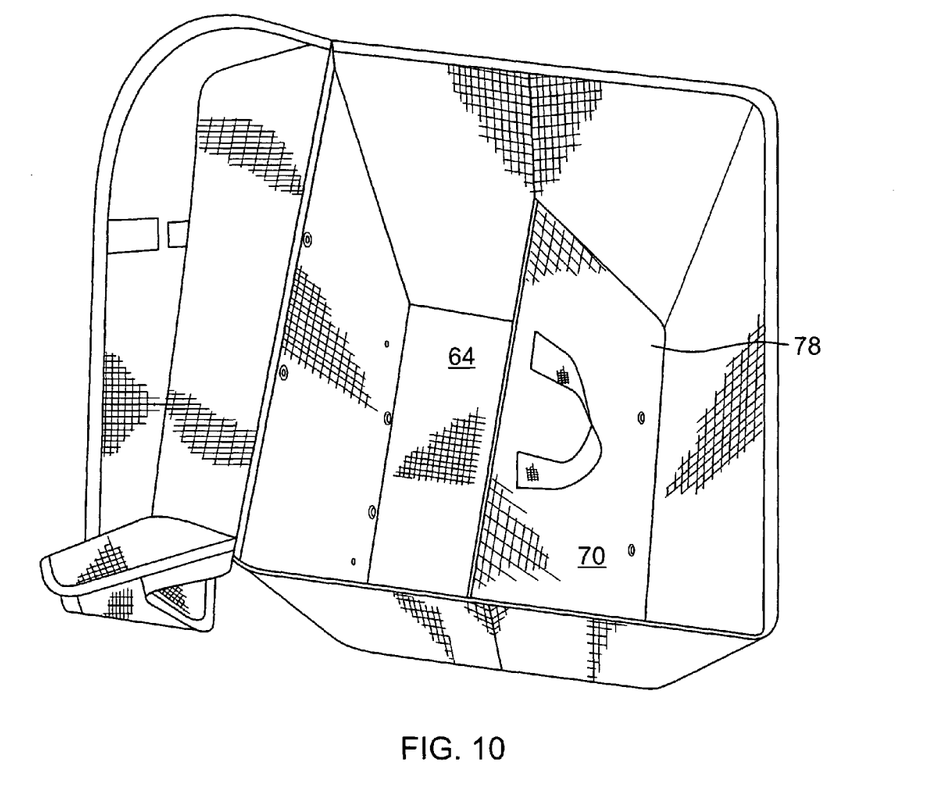
FIG. 10 is a perspective view of the present invention cart in the opened condition with the top set away from the interior chamber and the rotatable base member being rotated away from the bottom of the cart.
Figure 11:
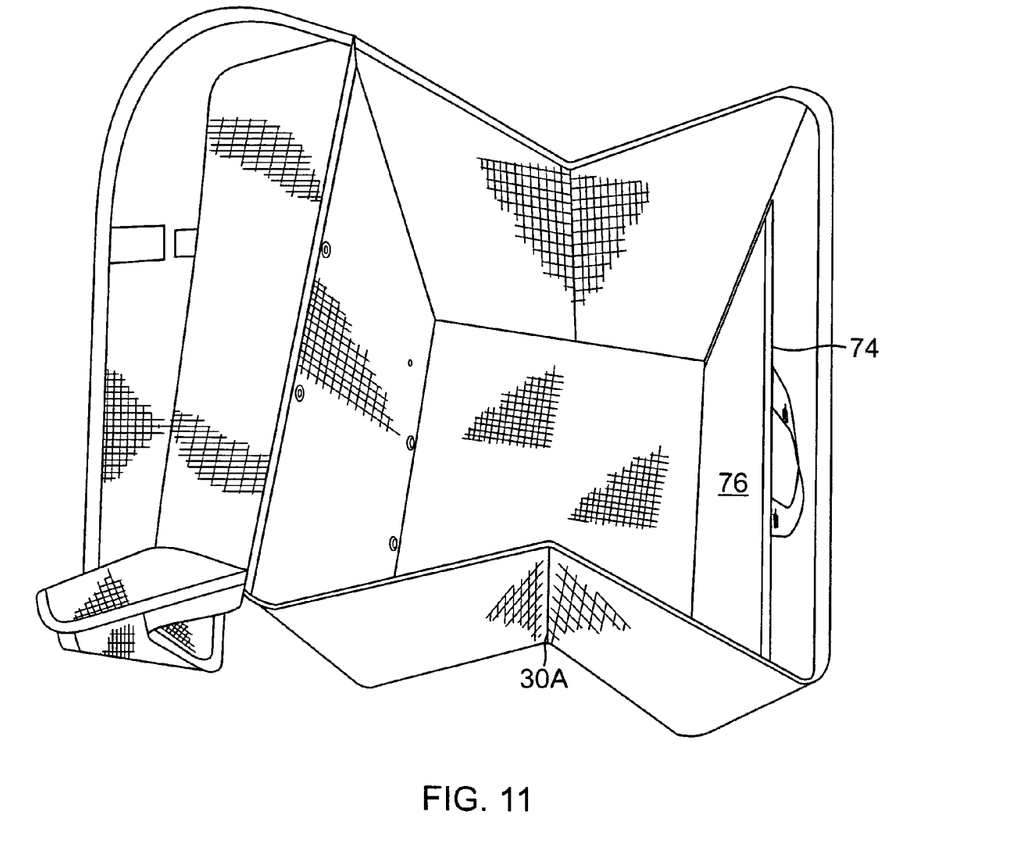
FIG. 11 is a perspective view of the present invention cart with the rotatable base member rotated to rest against the front wall of the cart and the sidewalls being folded inwardly along their respective creases.
Figure 12:
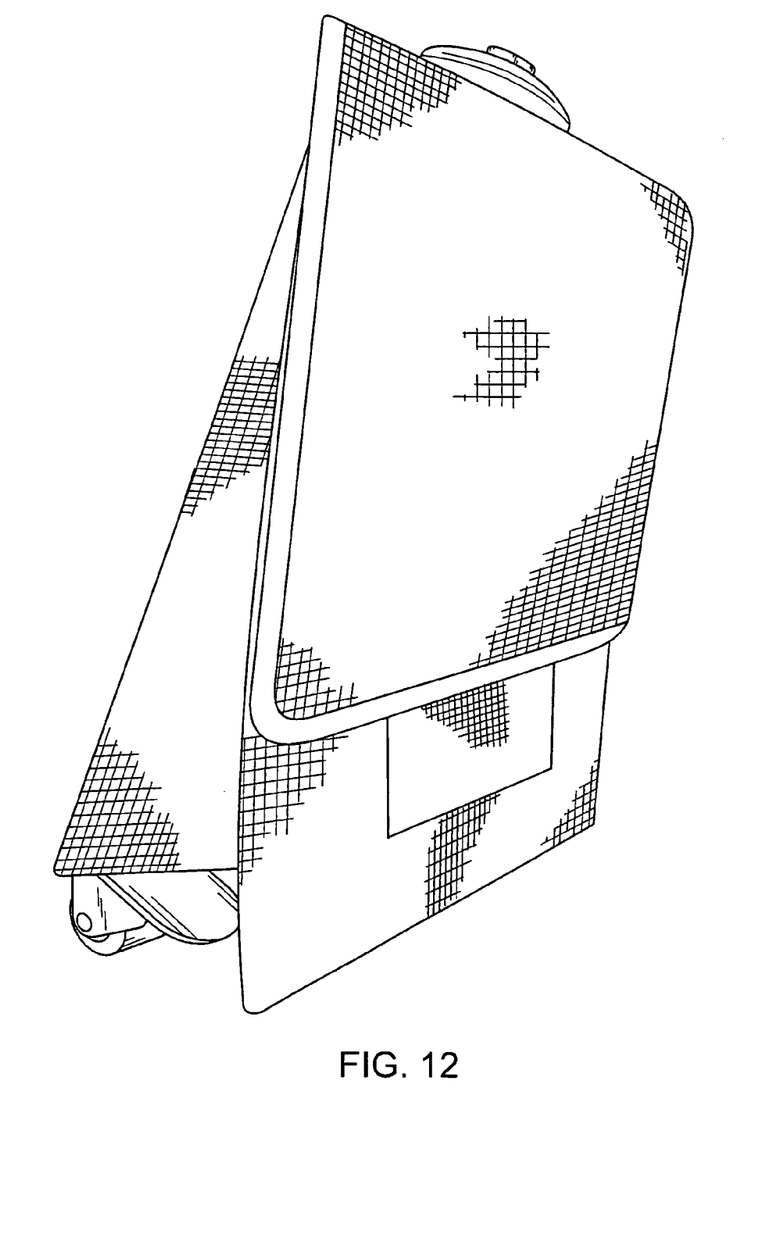
FIG. 12 is a front perspective view of the cart in the collapsed condition.
Figure 13:
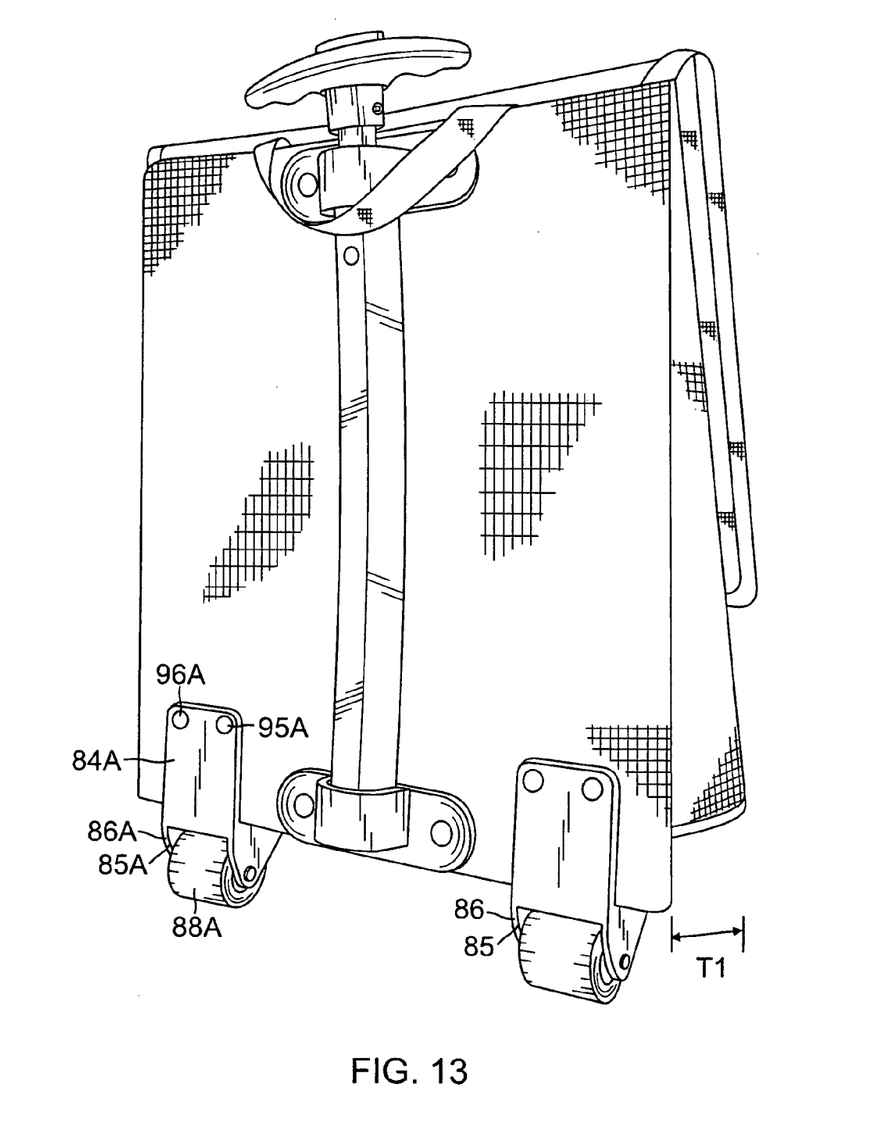
FIG. 13 is a rear perspective view of the cart in the collapsed condition.

A key innovation of the present invention is the design of the wide wheels and supporting front beam assembly. Referring to FIGS. 7 and 8, that cart 10 comprises a first wheel assembly 80 having a frame 82 with a first transverse wall 84 having an opening 83, a second transverse wall 86 having an opening 85, and space 87 between transverse walls 84 and 86 supporting a wide wheel 88 retained on an axle 90 supported in openings 83 and 85 of respective transverse walls 84 and 86. The wide wheel is at least 1.2 inches wide. second key innovation is a front plate 92 extending from frame 82 in front of transverse walls 84 and 86 and resting against bottom surface 62 of bottom wall 60. The frame 82 has a rear wall 94 by which the frame is affixed to the rear wall 40 by fastening means such as rivets 95 and 96. The first wheel assembly is adjacent the intersection of bottom wall 60, first sidewall 30 and rear wall 40.

The cart comprises a mirror image second wheel assembly 80A located adjacent the intersection of the bottom wall 60, the rear wall 40 and the second sidewall 50. The second wheel assembly 80A has a frame 82A with a first transverse wall 84A having an opening 83A, a second transverse wall 86A having an opening 85A, and space 87A between transverse walls 84A and 86A supporting a wide wheel 88A retained on an axle 90A supported in openings 83A and 85A of respective transverse walls 84A and 86A. The wide wheel is at least 1.2 inches wide. A second key innovation is a front plate 92A extending from frame 82A in front of transverse walls 84A and 86A and resting against bottom surface 62 of bottom wall 60. The frame 82A has a rear wall 94A by which the frame is affixed to the rear wall 40 by fastening means such as rivets 95A and 96A.

The additional key innovation of the present invention cart is a front beam assembly 100 comprising a beam member 110 affixed on its upper side 112 to the bottom surface 62 of bottom wall 60 and having a pair of spaced apart posts 120 and 130 extending transversely to the beam member 110 on the side 114 of the beam member 110 opposite to the side 112 affixed tot e bottom surface 62 of bottom wall 60 of cart 10. As illustrated in FIG. 8, the height "H1" of each post 120 and 130 combined with beam member 110 is the same as the height "H2" of the wide wheel 88 and its transverse walls 84 and 86 (and also for wide wheel 88A and transverse walls 84A and 86A. When the cart 10 rests on the ground, the bottom of each wide wheel 88 and 88A and the bottom of each post 120 and 130 touch the ground at the same level, providing a stabile structure. The combination of the wide wheels 88 and 88A, the respective front plates 92 and 92A which rest against the lower surface 62 of bottom wall 60 and also provide further support to the rotatable base member 70 combined with the beam assembly 100 and its posts 120 and 130 enable the cart to retain objects within its interior compartment 140 of at least one hundred and ten (110) pounds. Since the cart 10 weighs only about three (3) pounds, this is a significant design innovation.

The interior compartment is surrounded by interior surfaces 24, 34, 44, 54, and upper surface 78 of rotatable base member 70.

The cart 10 also has a flexible top 150 having a top surface 152, a bottom surface 154, a front edge 156, a first side edge 158, a rear edge 160 and a second side edge 162. The top 150 is affixed to the top edge 47 of rear wall 40 at its rear edge 160. The top 150 has a front flap 164 affixed to front edge 156, a first side flap 166 affixed to first side edge 158 and a second side flap 168 affixed to second side edge 162. The flaps are foldable against bottom surface 154 when not in use. When in use, the flaps respectively fit over front surface 22 of front wall 20, outer surface 32 of first sidewall 30 and outer surface 52 of second sidewall 50. Each flap may have at least one interior fastening member and preferably a pair of interior fastening members. The front flap 164 has an interior surface 164A having spaced apart fastening members 164B and 164C. These will respectively mate with mating fastening members 22B and 22C on outer surface 22 of front wall 20. Similarly first side flap 166 has an interior surface 166A having at least one and preferably a pair of spaced apart fastening members 166B and 166C. These will respectively mate with mating fastening members 32B and 32C on outer surface 32 of first sidewall 30. Similarly, second side flap 168 has an interior surface 168A having at least one and preferably a pair of spaced apart fastening members 168B and 168C. These will respectively mate with mating fastening members 52CB and 523C on outer surface 52 of second sidewall 50. By way of example, each of the mating fastening members can be mating hook and loop fasteners or mating snap fasteners. The flaps help to maintain the cart in a rigid open condition while transporting goods.

As illustrated in FIGS. 10-13, when it is desired to fold up the cart 10 for storage, the flaps 164, 166 and 168 and folded against the interior surface 154 of top 150, the base member 70 is rotated so that its upper surface 78 rests against interior surface 24 of front wall 20, first sidewall 30 is folded inwardly along crease 30A and second sidewall 50 is folded inwardly along crease 50A, and the cart 10 is folded up so that its thickness "T1" is only about two (2) inches which is much thinner can conventional fold-up carts which are usually at least three inches thick when folded. This is therefore a significant improvement of the present invention over prior art carts. The cart has a multiplicity of fastening member such as 210, 212 and 214 which facilitate keeping the cart 10 in a folded condition.

The cart 10 also includes an ergonomically designed handle 180, having an upper section 182 with a distal end 182A with a grasping member 190 attached thereto and a proximal end 182B. The handle has a lower section 184 with a distal end 184A. The proximal end 182B is affixed to the distal end 184A by push pins 192. When released, the upper section 182 is telescopically received within lower section 184. Lower section 184 has a proximal end 184B which is telescopically received within interior mating shaft 194 of cart 10. Therefore, when not in use, the handle 180 can be entirely retracted into the cart 10, with only the grasping section 190 protruding. The handle 180 has an arcuate ergonomic shape making the cart easier to pull.

The front wall can also have a pocket 200 affixed to its front surface 22. The outer surfaces can also contain a multiplicity of mating fasteners such as 210, 212 and 214 to help maintain the cart in its folded condition.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cart comprising:
   a. an integrally formed front wall having a front outer surface, a rear interior surface, a first longitudinal edge, a bottom edge, a top edge and a second longitudinal edge, an integrally formed first sidewall having an outer surface, an inner surface, a first longitudinal edge, a bottom edge, a top edge and a second longitudinal edge, the first sidewall having a central longitudinal crease enabling the first sidewall to be folded inwardly, an integrally formed rear wall having an outer rear surface, an interior surface, a first longitudinal edge, a bottom edge, a top edge and a second longitudinal edge, an integrally formed second sidewall having an outer surface, an inner surface, a first longitudinal edge, a bottom edge, a top edge and a second longitudinal edge, the second sidewall has a central longitudinal crease enabling the second sidewall to be folded inwardly. a bottom wall having an outer lower surface, an inner surface, a front edge, a first side edge, a rear edge and a second side edge, the cart is integrally formed so that the front wall is attached to the bottom wall and to the first sidewall and second sidewall along respective edges, the first sidewall is attached to the bottom wall and to the front wall and rear wall along respective edges, the rear wall is attached to the bottom wall and to the first sidewall and to the second sidewall along respective edges, the second sidewall is attached to the bottom wall to the rear wall and to the front wall along respective edges;
   b. a rotatable base member having a front edge affixed to the bottom edge of the front wall and front edge of the bottom wall, the rotatable base member having a hard interior which is surrounded by a lower surface and an upper surface, when in use, the base member is rotated so that its lower surface rests against the interior surface of the bottom wall to form a strong base and to keep the cart in an opened condition so that the sidewalls cannot fold inwardly, and when the base member is rotated so that its upper surface rests against the interior surface of the front wall, the cart can be folded;
   c. an interior compartment surround by interior surfaces of the front wall, first sidewall, rear wall, second sidewall, and upper surface of the rotatable base member;
   d. a first wheel assembly having a frame with a first transverse wall having an opening, a second transverse wall having an opening, and a space between the transverse walls receiving a wide wheel within the space and retained on an axle supported in the openings of the respective transverse walls, a front plate extending from the frame in front of the transverse walls and resting against the bottom surface of the bottom wall, the frame has a rear wall by which the frame is affixed to the rear wall of the cart by fastening means, the first wheel assembly is adjacent the intersection of the bottom wall the first sidewall and the rear wall;
   e. a mirror image second wheel assembly located adjacent the intersection of the bottom wall, the rear wall and the second sidewall, the second wheel assembly having a frame with a first transverse wall having an opening, a second transverse wall having an opening, and a space between the transverse walls receiving a wide wheel within the space and supported on an axle supported in the openings of the respective transverse walls, a front plate extending from the frame in front of transverse walls and resting against bottom surface of the bottom wall of the cart, the frame having a rear wall by which the frame is affixed to the rear wall of the cart by fastening means; and
   f. a front beam assembly comprising a beam member affixed on its upper side to the bottom surface of bottom wall and having a pair of spaced apart posts extending transversely to the beam member on the side of the beam member opposite to the side affixed to the bottom surface of the bottom wall of the cart, a given height of each post combined with the beam member being substantially the same as a given height of each wide wheel and its respective transverse walls so that when the cart rests on a level surface, a bottom of each wide wheel and a bottom of each post touch the level surface at the same level, providing a stabile structure, the combination of the wide wheels, the respective front plates which rest against the lower surface of the bottom wall of the cart also provide further support to the rotatable base member combined with the beam assembly and its posts to enable the cart to retain heavy objects within its interior compartment.

2. The cart in accordance with claim 1, further comprising:
   a. a flexible top having a top surface, a bottom surface, a front edge, a first side edge, a rear edge and a second side edge, the top is affixed to the top edge of rear wall at its rear edge, the top having a front flap affixed to front edge, a first side flap affixed to first side edge and a second side flap affixed to second side edge, the flaps are foldable against bottom surface when not in use, and when in use, the flaps respectively fit over the front surface of front wall of the cart, the outer surface of first sidewall and the outer surface of second sidewall.

3. The cart in accordance with claim 1, further comprising:
   a. an ergonomically designed handle having an upper section with a distal end with a grasping member attached thereto and a proximal end, the handle having a lower section with a distal end, the proximal end is affixed to the distal end by push pins;
b. when the push pins are released, the upper section is telescopically received within the lower section, the lower section having a proximal end which is telescopically received within an interior mating shaft of the cart so that when not in use, the handle is entirely retracted into the cart with only the grasping member protruding; and
c. the handle having an arcuate ergonomic shape making the cart easier to pull.

4. The cart in accordance with claim 1, further comprising each wide wheel is two inches in length.

5. The cart in accordance with claim 1, further comprising: the front wall, rear wall, first sidewall, second sidewall, and bottom wall are all made out of fabric material.

6. The cart in accordance with claim 2, further comprising each flap has at least one interior fastening member which mates with a respective mating fastening member on the front surface of the front wall, the outer surface of the first sidewall and the outer surface of the second sidewall.

7. The cart in accordance with claim 2, further comprising:
a. when it is desired to fold up the cart for storage, the flaps are folded against the interior surface of the top, the base member is rotated so that its upper surface rests against the interior surface of the rear wall of the cart, the first sidewall is folded inwardly along its crease and the second sidewall is folded inwardly along its crease so that when folded up, the folded cart is only approximately two inches thick.

8. The cart in accordance with claim 7, further comprising a multiplicity of fastening members on the exterior surfaces of its walls to facilitate retaining the cart in a folded condition.

9. The cart in accordance with claim 5, further comprising the cart weighs approximately three pounds.

10. A cart comprising:
a. an integrally body having a front wall, an integrally formed first sidewall, an integrally formed rear wall, an integrally formed second sidewall, and an integrally formed bottom wall all made out of fabric material and all surrounding an interior compartment;
b. a rotatable base member rotatably affixed within the interior compartment of the cart, the rotatable base member having a hard interior which is surrounded by a lower surface and an upper surface, when in use, the base member is rotated so that its lower surface rests against an interior surface of the bottom wall of the cart to form a strong base and to keep the cart in an opened condition so that the sidewalls cannot fold inwardly, and when the base member is rotated so that its upper surface rests against an interior surface of the rear wall, the cart can be folded;
c. a first wheel assembly having a frame with a first transverse wall having an opening, a second transverse wall having an opening, and a space between the transverse walls receiving a wide wheel retained on an axle supported in the openings of the respective transverse walls, a front plate extending from the frame in front of the transverse walls and resting against the bottom surface of the bottom wall, the frame affixed to the rear wall of the cart by fastening means, the first wheel assembly is adjacent the intersection of the bottom wall, the first sidewall and the rear wall;
d. a mirror image second wheel assembly located adjacent the intersection of the bottom wall, the rear wall and the second sidewall, the second wheel assembly having a frame with a first transverse wall having an opening, a second transverse wall having an opening, and a space between the transverse walls receiving a wide wheel within the space and supported on an axle supported in the openings of the respective transverse walls, a front plate extending from the frame in front of transverse walls and resting against the bottom surface of the bottom wall of the cart, the frame affixed to the rear wall of the cart by fastening means; and
e. a front beam assembly comprising a beam member affixed on its upper side to the bottom surface of the bottom wall of the cart and having a pair of spaced apart posts extending transversely to the beam member on the side of the beam member opposite to the side affixed to the bottom surface of the bottom wall of the cart, a given height of each post combined with the beam member being substantially the same as a given height of each wide wheel and its respective transverse walls so that when the cart rests on a level surface, a bottom of each wide wheel and a bottom of each post touch the level surface at the same level, providing a stabile structure, the combination of the wide wheels, the respective front plates which rest against the lower surface of the bottom wall of the cart also provide further support to the rotatable base member combined with the beam assembly and its posts enable the cart to retain heavy objects within its interior compartment.

11. The cart in accordance with claim 10, further comprising:
a. a flexible top having a top surface, a bottom surface, a front edge, a first side edge, a rear edge and a second side edge, the top is affixed at its rear edge to a top edge of the rear wall of the cart, the top having a front flap affixed to the front edge, a first side flap affixed to the first side edge and a second side flap affixed to the second side edge, the flaps are foldable against the bottom surface when not in use, and when in use, the flaps respectively fit over a front surface of the front wall of the cart, an outer surface of the first sidewall and an outer surface of the second sidewall.

12. The cart in accordance with claim 10, further comprising:
a. an ergonomically designed handle having an upper section with a distal end with a grasping member attached thereto and a proximal end, the handle having a lower section with a distal end, the proximal end is affixed to the distal end by push pins;
b. when the push pins are released, the upper section is telescopically received within the lower section, the lower section having a proximal end which is telescopically received within an interior mating shaft of the cart so that when not in use, the handle is entirely retracted into the cart with only the grasping member protruding; and
c. the handle having an arcuate ergonomic shape making the cart easier to pull.

13. The cart in accordance with claim 10, further comprising each wide wheel is two inches in length.

14. The cart in accordance with claim 10, further comprising: the front wall, rear wall, first sidewall, second sidewall, and bottom wall are all made out of fabric material.

15. The cart in accordance with claim 11, further comprising each flap has at least one interior fastening member which mates with a respective mating fastening member on the front surface of the front wall, the outer surface of the first sidewall and the outer surface of the second sidewall.

16. The cart in accordance with claim 15, further comprising:
   a. when it is desired to fold up the cart for storage, the flaps are folded against the interior surface of the top, the base member is rotated so that its upper surface rests against an interior surface of the rear wall of the cart, the first sidewall is folded inwardly along a crease and the second sidewall is folded inwardly along a crease so that when folded up, the folded cart is only approximately two inches thick.

17. The cart in accordance with claim 16, further comprising a multiplicity of fastening members on the exterior surfaces of its walls to facilitate retaining the cart in a folded condition.

18. The cart in accordance with claim 14, further comprising the cart weighs approximately three pounds.

\* \* \* \* \*